United States Patent [19]

Reed

[11] 4,444,237
[45] Apr. 24, 1984

[54] SPLIT WHEEL ASSEMBLER/DISASSEMBLER TOOL

[76] Inventor: Eldridge J. Reed, 992 W. 2200 N., Layton, Utah 84041

[21] Appl. No.: 345,119

[22] Filed: Feb. 2, 1982

[51] Int. Cl.³ .......................................... B60C 25/06
[52] U.S. Cl. ................................................. 157/1.2
[58] Field of Search ................... 29/258, 266; 157/1.2, 157/1.24

[56] References Cited

U.S. PATENT DOCUMENTS

| | | |
|---|---|---|
| 1,305,322 | 6/1919 | Towler . |
| 2,235,953 | 3/1941 | Whitfield .............................. 94/50 |
| 2,640,728 | 6/1953 | Slack ...................................... 301/9 |
| 2,890,745 | 6/1959 | Pientkewic ......................... 157/1.2 |
| 2,964,841 | 12/1960 | Farris ................................ 29/266 X |
| 3,216,098 | 11/1965 | Ratz ................................... 29/226 |
| 3,758,931 | 9/1973 | Patterson ........................ 29/159.02 |
| 3,851,696 | 12/1974 | Pihlaja ............................... 157/1.2 |
| 3,867,975 | 2/1975 | Johnson ............................. 157/1.2 |
| 3,905,413 | 9/1975 | Myers ................................ 157/1.24 |
| 4,381,028 | 4/1983 | Patry ................................. 157/1.24 |

FOREIGN PATENT DOCUMENTS 492552  2/1930  Fed. Rep. of Germany ....... 157/1.2

*Primary Examiner*—James G. Smith
*Attorney, Agent, or Firm*—Donald J. Singer; Jacob N. Erlich

[57] ABSTRACT

A split wheel assembler/disassembler tool having a base plate, a plurality of outstanding elements for engaging and preventing the rotation of wheel fastening bolts and a tire compressor. During the assembly procedure, the outstanding elements prevent the fastening bolts from rotating while a tire mounted upon a wheel subassembly is compressed sufficiently to enable the fastening bolts to protrude through openings in a demountable flange utilized in conjunction with the wheel subassembly. Thereafter, nuts can be applied to the bolts and torqued with a desired force thereby securely positioning the demountable flange against the wheel subassembly. During disassembly, the tool aids in securely positioning the wheel fastening bolts while the nuts are removed.

5 Claims, 5 Drawing Figures

SPLIT WHEEL ASSEMBLER/DISASSEMBLER TOOL

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a tool used in the assembly and disassembly of split wheels, and, more particularly, to a split wheel assembler/disassembler tool which is capable of not only simultaneously preventing the rotation of split wheel fastening bolts, but also acting as a tire compresser during the assembly operation.

The split wheel finds its primary utility as a main wheel for many types of aircraft such as the F-15 and F-16 as well as a wheel for larger sized vehicles such as trucks. The split wheel is made up of a wheel subassembly upon which is mounted a suitable tubeless tire, with the tubeless tire being held in position by a demountable flange. Bolts are utilized to securely mount the demountable flange to the wheel subassembly.

Unfortunately, many of the tires which are used with the split wheel are made of an extremely stiff 18 ply rating rubber material. Consequently, the bolts which are used to secure the demountable flange to the wheel subassembly do not sufficiently protrude through the demountable flange with the tire in its natural state and positioned on the subassembly. Securement of the demountable flange to the subassembly becomes a time consuming, highly cumbersome procedure which in some instances requires three individuals. In addition, with increased safety requirements, even thicker and stiffer rubber may be required for the manufacture of the tires, resulting in even further hardship during the assembly of split wheels.

For example, it was generally required that an above average strength individual hold the fastening bolts in place while with the assistance of others simultaneously applying force sufficient to compress the tire so that the bolts would protrude through the demountable flange. During the above strenuous undertaking, it was also necessary to tighten the bolts to a required torque of, for example, 600 inch pounds. The disassembly procedure, although a little simpler, also required a large amount of time and a cumbersome operation. The above procedure clearly caused time delays in the assembly and disassembly of split wheels and in many instances substantially decreased the reliability of the split wheel assembly.

It therefore becomes essential to provide a tool which is capable of aiding in the split wheel assembly and disassembly procedure by not only providing simultaneous securement of the bolts fastening the demonountable flange to the wheel subassembly but also providing a means for compressing the tire during the assembly operation.

SUMMARY OF THE INVENTION

The present invention overcomes the problems encountered in the past and as set forth in detail hereinabove by providing a split wheel assembler/disassembler tool which is capable of simultaneously preventing the rotation of the fastening bolts while quickly compressing the tire mounted upon the wheel subassembly during split wheel assembly and disassembly by a single individual.

The tool is made up of a base plate having a plurality of circumferentially spaced, outstanding, elongated spindles secured at one end thereto. These spindles are positioned upon the base plate so as to be aligned with the fastening bolts utilized to secure the demountable flange to the wheel subassembly of the split wheel. In addition, the free end of each elongated spindle has a socket-like element removably secured thereto which is of the appropriate size to engage the heads of the wheel fastening bolts in order to prevent their rotation.

An elongated center post is supported by the base plate and threadably engages a threaded extension bar. The threaded extension bar in turn slidably supports a clamping cross-bar. A hand operated crank is threadably mounted on the extension bar so as to bear against the cross-bar during utilization thereof.

When the split wheel assembler/disassembler tool of this invention is utilized in conjunction with the assembly of a split wheel, the base plate is positioned so as to have the elongated spindles aligned with the wheel fastening bolts, with the bolts being held in secure, nonrotatable position by the socket-like elements. In this position a tubeless tire can be placed upon the wheel subassembly and a demountable flange placed thereupon in alignment with the wheel fastening bolts.

Thereafter the threaded extension bar is joined to the elongated center post and the cross-bar is slid thereon so as to engage the demountable flange. The hand operated crank is threadably mounted on the extension bar so as to bear against the cross-bar. As the crank is rotated on the extension bar, the cross-bar slowly compresses the tire so that the wheel fastening bolts can protrude through the demountable flange. After sufficient compression of the tire, nuts can be applied to the wheel bolts and torqued to the appropriate force so as to securely hold the demountable flange, tubeless tire and wheel assembly in their appropriate positions with respect to one another. Following completion of the assembly of the split wheel, the tool of this invention can be easily removed.

The disassembly procedure merely requires the tool to be inserted within the split wheel so that the elongated spindles and socket-like elements are aligned with and are capable of engaging the wheel bolts. It may or may not be necessary to utilize the cross-bar to maintain the tire in the compressed state while the nuts are removed from the wheel fastening bolts.

It is therefore an object of this invention to provide a tool which is capable of aiding in the assembly and disassembly of a split wheel.

It is another object of this inventin to provide a split wheel assembler/disassembler tool which substantially decreases the time involved in split wheel assembly and disassembly.

It is a further object of this invention to provide a split wheel assembler/disassembler tool which acts as a tire compressor.

It is still another object of this invention to provide a split wheel assembler/disassembler tool which is economical to produce and which utilizes conventional, currently available components that lend themselves to standard mass producing manufacturing techniques.

For a better understanding of the present invention, together with other and further objects thereof, reference is made to the following description taken in con-

DETAILED DESCRIPTION OF THE DRAWING

DETAILED DESCRIPTION OF THE PREFERRED EMBODIMENT

Figure 1:
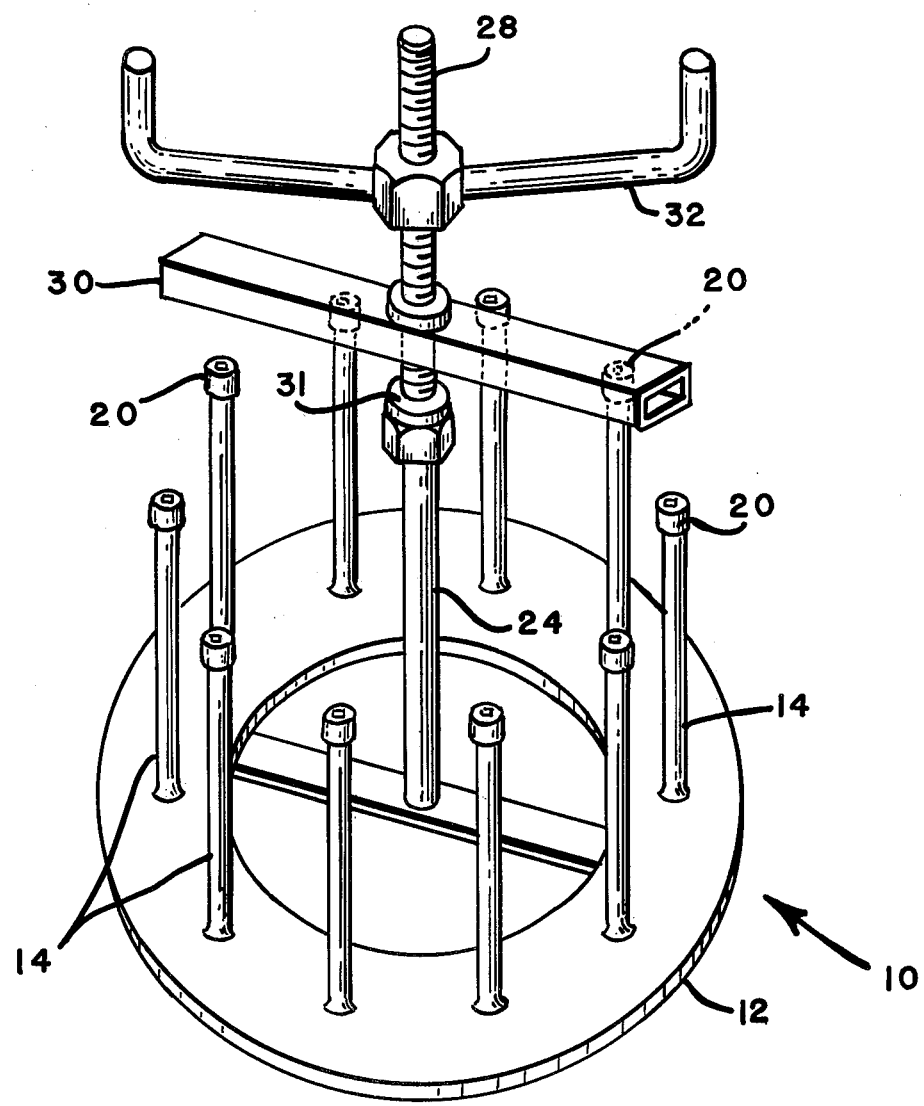
FIG. 1 is a pictorial representation of the split wheel assembler/disassembler tool of this invention.

Reference is now made to FIG. 1 of the drawing which shows in pictorial fashion the split wheel assembler tool 10 of this invention. Tool 10 is made up of a base plate 12, preferably circular in cross section, having a plurality of circumferentially spaced, outstanding, elongated spindles 14 secured thereto. Securement of spindles 14 to base plate 12 may take place by either threadably securing spindles 14 to base plate 12 or welding them in place. The number of spindles 14 utilized with tool 10 of this invention varies in accordance with the number of wheel fastening bolts 16 used with split wheel 18, preferably ten in number, and shown in FIGS. 2, 4 and 5 of the drawing.

As shown in FIG. 1 each of the free ends of the spindles 14 have a socket-like element 20 affixed thereto. This socket-like element 20 can be removably mounted on spindle 14 so that different sized socket-like elements 20 can be used with this invention. The size of the socket-like element 20 varies in accordance with the type of bolt head 22 (shown in FIGS. 4 and 5) found on wheel fastening bolts 16.

Centrally located and securely affixed at one end thereof to base plate 12 is an elongated center post 24 which has an internally threaded mount 26 at the free end thereof. Threadably engaging mount 26 in a manner to be described in detail hereinbelow is an externally threaded extension bar 28. A clamping cross-bar 30 is slidably mounted on extension bar 28, while a hand operated crank 32 threadably engages extension bar 28 so as to bear against cross-bar 30. Downward movement of cross-bar 30 is limited by means of a conventional stop washer 31 (shown in FIG. 4) fixedly attached to extension bar 28.

The split wheel assembler/disassembler tool 10 of this invention is manufactured from any sturdy material such as steel and is uniquely designed so as to be operational with any type of split wheel during the assembly and disassembly procedure. For a clearer understanding of the operation of the present invention, reference is now made to FIGS. 2 and 3 of the drawing which show in detail a typical split wheel 18 with which the instant invention is utilized.

Figure 2:
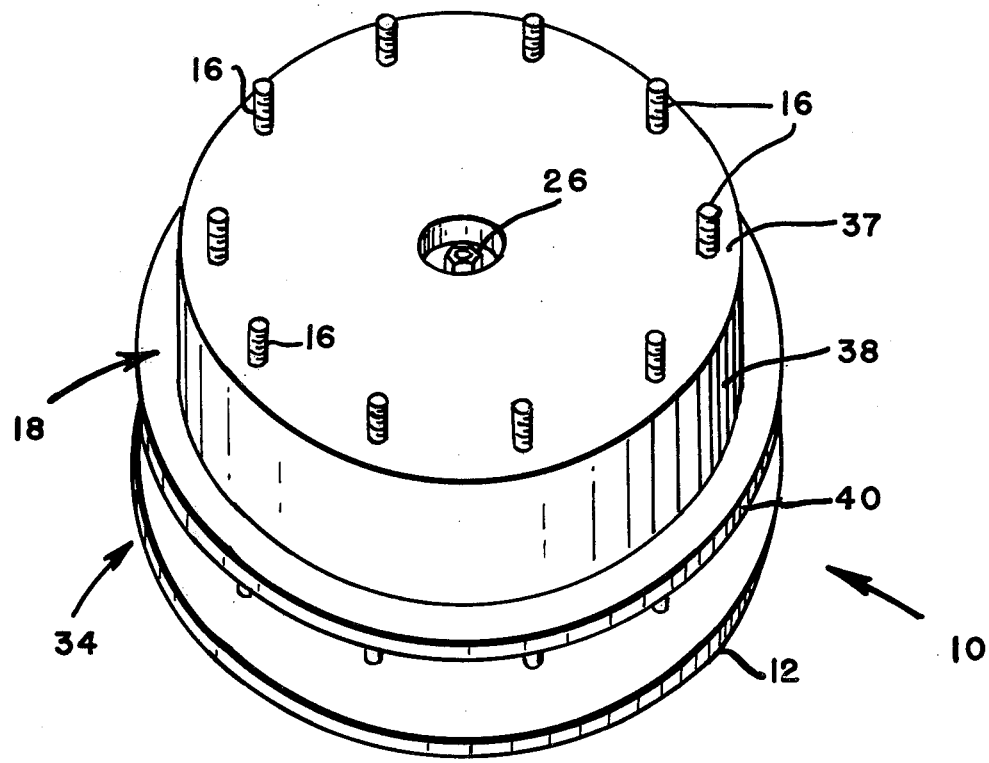
FIG. 2 is a pictorial representation of the wheel subassembly of the split wheel with which the assembler/disassembler tool of this invention is utilized.

As shown in FIG. 2 of the drawing, split wheel 18 is made up of a wheel subassembly 34 upon which a suitable tubeless tire 36 can be placed. Wheel subassembly 34 may be preferably made of one piece construction having a base 37 and an annular shaped rim extending therefrom. On the external end portion of rim 38, opposite base 37, is a flange 40 which is utilized to engage and hold in position the inner surface of one side of tire 36.

Figure 3:
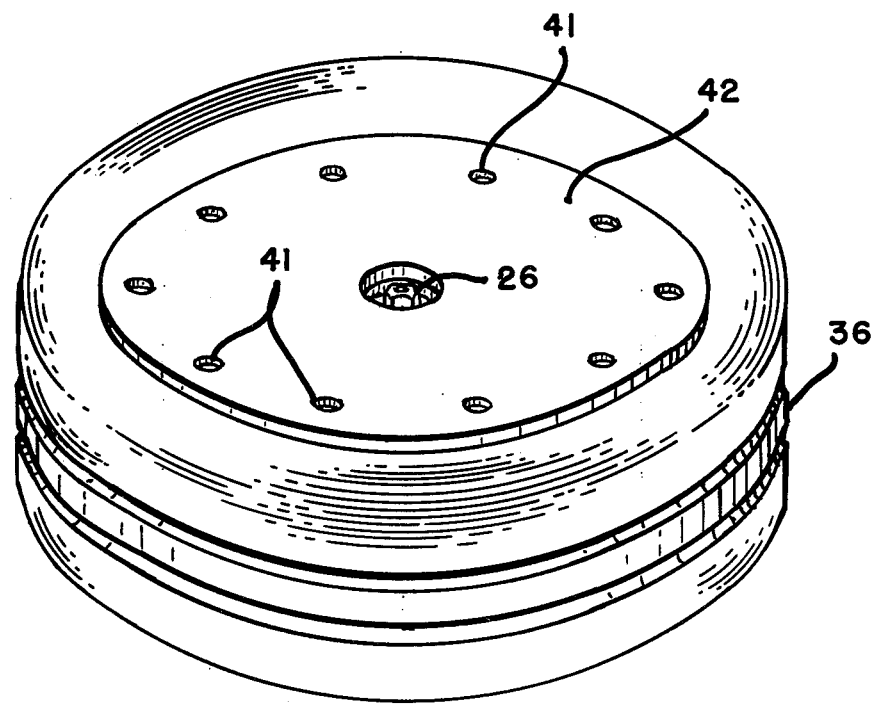
FIG. 3 is a pictorial representation of a tubeless tire placed upon the wheel subassembly with the demountable flange also in place prior to using the split wheel assembler/disassembler tool of this invention.

As clearly shown in FIG. 3 of the drawing a demountable flange 42 is placed upon the other side of tire 36 so as to bear against the inner surface thereof and complete the construction of split wheel 18. Unfortunately, for the reasons given hereinabove, in many instances wherein tubeless tire 36 is manufactured of a stiff rubber material, wheel fastening bolts 16 fail to protrude completely through the bolt openings 1 of demountable flange 42. In order to complete the assembly of split wheel 18 it is therefore necessary to compress tire 36 sufficiently to enable the wheel bolts 16 to protrude through openings 41 within demountable flange 42 and thus enable nuts to be attached thereto and torqued to the appropriate force.

MODE OF OPERATION

Figure 4:
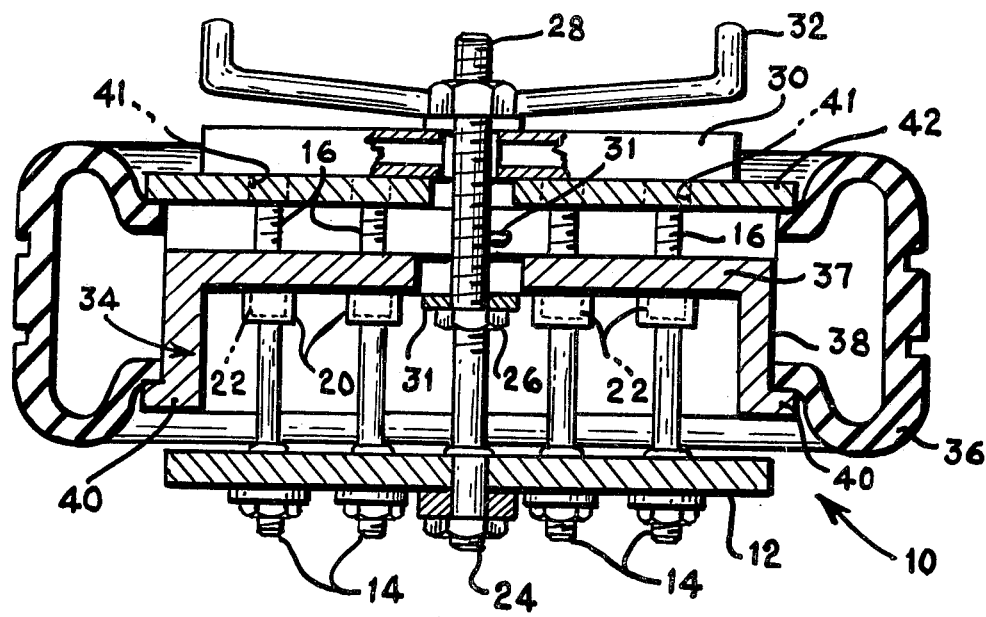
FIG. 4 is a side elevational view of the split wheel assembler/disassembler tool of this invention depicted in position with a split wheel prior to tire compression and shown partly in cross section.
Figure 5:
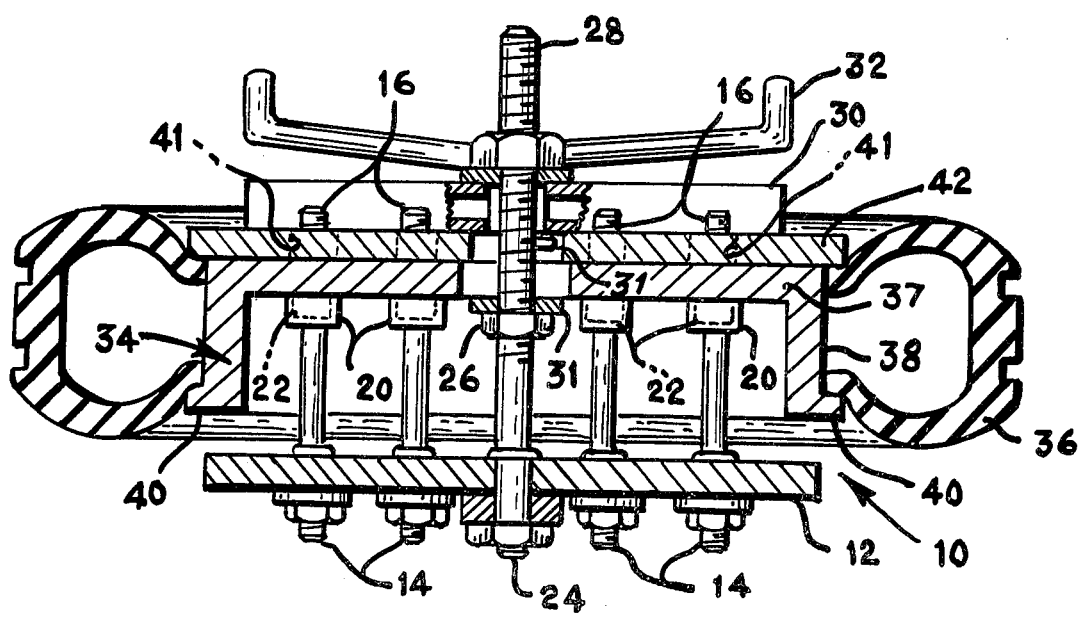
FIG. 5 is a side elevational view of the split wheel assembler/disassembler tool of this invention during operation with the tire in the compressed state and shown partly in cross section.

The split wheel assembler/disassembler tool 10 of this invention is uniquely designed so as to aid in the assembly and disassembly procedure. As shown in FIG. 4 of the drawing, tool 10 is positioned within wheel subassembly 34 with the elongated spindles 14 and socket-like elements 20 aligned with heads 22 of wheel fastening bolts 16. In this manner, wheel bolts 16 can be engaged by socket-like elements 20 so as to securely position and restrain the movement of bolts 16 while the remaining assembly operation takes place. Thereafter, extension bar 28 is threadably mounted on center post 24 so as to be fixedly secured thereto. The cross-bar 30 is then slid upon extension bar 28 until it engages the top surface of demountable flange 42. Hand operated crank 32 is threaded onto extension bar 28 until it bears against cross-bar 30. Continued rotation of crank 32 on extension bar 28 forces cross-bar 30 to move downward against demountable flange 42 and thereby compress tire 36 to a position shown in FIG. 5 of the drawing.

After appropriate compression of tire 36 has taken place, nuts can be secured to bolts 16 and torqued to the appropriate force of, for example, 660 inch pounds. It is virtually impossible for a single individual to assemble stiff tires upon split wheels without the use of tool 10 of this invention.

As can be seen by the operation of split wheel assembler/disassembler tool 10 of this invention both hands of an operator are free. This is critical in the assembly procedure in order to accomplish the proper torque of, for example, 660 inch pounds to the nuts. Tool 10 can be removed after assembly of split wheel 18 by striking the tool base plate 12 at an angle so as to release the socket-like elements 20 from bolt heads 22.

During the disassembly of split wheel 18, it is merely necessary to insert the tool 10 within the split wheel subassembly 34 with the elongated spindle 14 aligned with bolt heads 22. The nuts, in turn, can be easily unscrewed with the socket-like elements 20 acting as a means for restraining the rotation of bolts 16 during the disassembly procedure. In some instances it may be also necessary to apply the use of the cross-bar 30 against demountable flange 42 in order to maintain tire 36 in its compressed position during removal of nuts from bolts 16. This is a much safer and easier way of disassembling split wheel 18.

Although this invention has been described with reference to a particular embodiment, it will be understood that this invention is also capable of further and other embodiments within the spirit and scope of the appended claims. For example, crank 32 may be fixedly secured to the uppermost portion of extension bar 28 with the cross-bar 30 mounted adjacent crank 32 by means of a pin positioned through extension bar 28 therebeneath. In this manner extension bar 28 can be rotated within cross-bar 30. Center post 24 may then be internally threaded to matingly engage extension bar 28. In operation, extension bar 28 along with cross-bar 30 and crank may be lowered as a unit upon the rotation of crank 32 in order to compress tire 36.

I claim:

1. A tool for use in assembling and disassembling a split wheel having a wheel subassembly, a tubeless tire positioned about said wheel subassembly, a demountable flange removably securable to said wheel subassembly, and a plurality of bolts for securing said demountable flange to said wheel subassembly, said tool comprising:

a base plate, a plurality of outstanding elements, each of said outstanding elements being secured at one end thereof to said base plate in aligned relationship with respect to each of said plurality of bolts for securing said demountable flange to said wheel subassembly, respectively, each of said outstanding elements having a socket-like element being non-rotatably but removably attached to the other end of said outstanding element for engaging each of said bolts, respectively, in order to prevent said bolts from rotating;

an element centrally upstanding from said base plate; and means operable connected to said centrally upstanding element for compressing said tire prior to securement of said demountable flange to said wheel assembly;

whereby said assembly and disassembly of said split wheel is accomplished rapidly.

2. A tool for use in assembling and disassembling a split wheel as defined in claim 1 wherein said compressing means comprises means for applying a predetermined amount of force to said demountable flange, and means for supporting said force applying means.

3. A tool for use in assembling and disassembling a split wheel as defined in claim 2 wherein said support means for said force applying means is removably secured to said centrally upstanding element.

4. A tool for use in assembling and disassembling a split wheel as defined in claim 3 said force applying means comprises a cross-bar slidably mounted on said support means, and a crank positioned adjacent said cross-bar and threadably engaging said support means.

5. A tool for use in assembling and disassembling a split wheel as defined in claim 3 wherein said force applying means comprises a crank fixedly secured to the uppermost portion of said support means, a cross-bar rotatably secured to said support means adjacent said crank, and said support means threadably engaging said centrally upstanding element for movement with respect thereto.

* * * * *